(12) United States Patent
Lee

(10) Patent No.: US 12,738,871 B2
(45) Date of Patent: Sep. 15, 2026

(54) MOTOR CONTROLLER

(71) Applicant: Infineon Technologies Austria AG, Villach (AT)

(72) Inventor: Young Joo Lee, Rancho Palos Verdes, CA (US)

(73) Assignee: Infineon Technologies Austria AG, Villach (AT)

(*) Notice: Subject to any disclaimer, the term of this patent is extended or adjusted under 35 U.S.C. 154(b) by 185 days.

(21) Appl. No.: 18/621,442

(22) Filed: Mar. 29, 2024

(65) Prior Publication Data

US 2025/0309807 A1 Oct. 2, 2025

(51) Int. Cl.
*H02P 6/18* (2016.01)
*H02P 21/14* (2016.01)
*H02P 21/34* (2016.01)
*H02P 25/024* (2016.01)

(52) U.S. Cl.
CPC .............. *H02P 21/34* (2016.02); *H02P 21/14* (2013.01); *H02P 25/024* (2016.02)

(58) Field of Classification Search
CPC ........ H02P 21/34; H02P 25/024; H02P 21/14; H02P 6/183
See application file for complete search history.

(56) References Cited

U.S. PATENT DOCUMENTS

2008/0272731 A1 11/2008 Schulz et al.
2010/0283414 A1 11/2010 Jun et al.
2010/0327789 A1* 12/2010 De Belie .................. H02P 6/16 318/400.33
2013/0221885 A1* 8/2013 Hunter .................... H02P 21/18 318/400.15
2014/0333241 A1 11/2014 Zhao et al.
2015/0084576 A1 3/2015 Magee
2016/0359442 A1 12/2016 Zhao et al.
2017/0129340 A1 5/2017 Murthy et al.
2018/0212541 A1 7/2018 Li et al.
2018/0375453 A1* 12/2018 Mao ........................ H02P 6/183
2019/0028044 A1 1/2019 Ochs et al.
(Continued)

FOREIGN PATENT DOCUMENTS

CN 101841297 A 9/2010

OTHER PUBLICATIONS

Tomislav Strinic, et al., "Self-Commissioning of Permanent Magnet Synchronous Machines by Considering Nonlinearities of the Voltage Source Inverter", IECON 2019—45th Annual Conference of the IEEE Industrial Electronics Society, Lisbon, Portugal, 2019, pp. 1320-1326.
(Continued)

*Primary Examiner* — Cortez M Cook
(74) *Attorney, Agent, or Firm* — Cooper Legal Group LLC

(57) ABSTRACT

According to some embodiments, a motor controller has a first controller operating in a start-up mode and configured to apply a high frequency injection signal to a motor, extract a motor parameter based on a measured response to the high frequency injection signal, determine an alignment error of the motor based on the measured response, and correct the motor parameter based on the alignment error to generate a corrected motor parameter, and a second controller operating in a control mode and configured to control the motor based on the corrected motor parameter.

20 Claims, 5 Drawing Sheets

(56) References Cited

U.S. PATENT DOCUMENTS

| | | | |
|---|---|---|---|
| 2019/0389505 | A1 | 12/2019 | Pramod et al. |
| 2021/0359630 | A1* | 11/2021 | Xu .......................... H02P 6/183 |
| 2022/0041669 | A1 | 2/2022 | Miller et al. |

OTHER PUBLICATIONS

Mng Chen, et al., "Off-line Parameter Identification of Permanent Magnet Synchronous Motor", Journal of Physics: Conference Series, 2076 (2021) 012096.

European Search Report from Corresponding European Patent Application No. 22180346.3, dated Nov. 17, 2022, 11 pages.

* cited by examiner

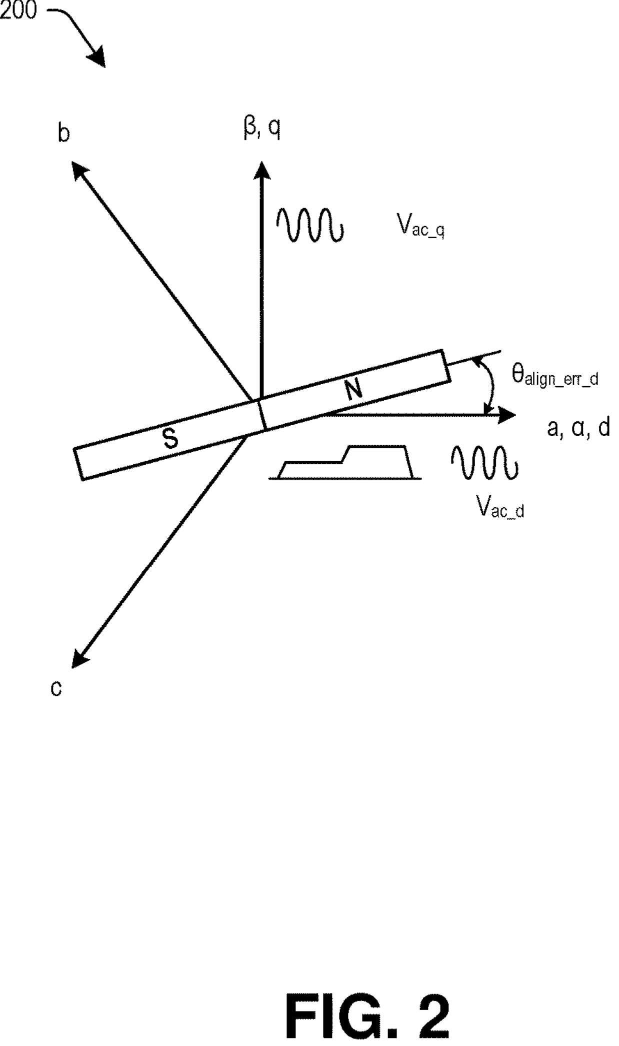
FIG. 2
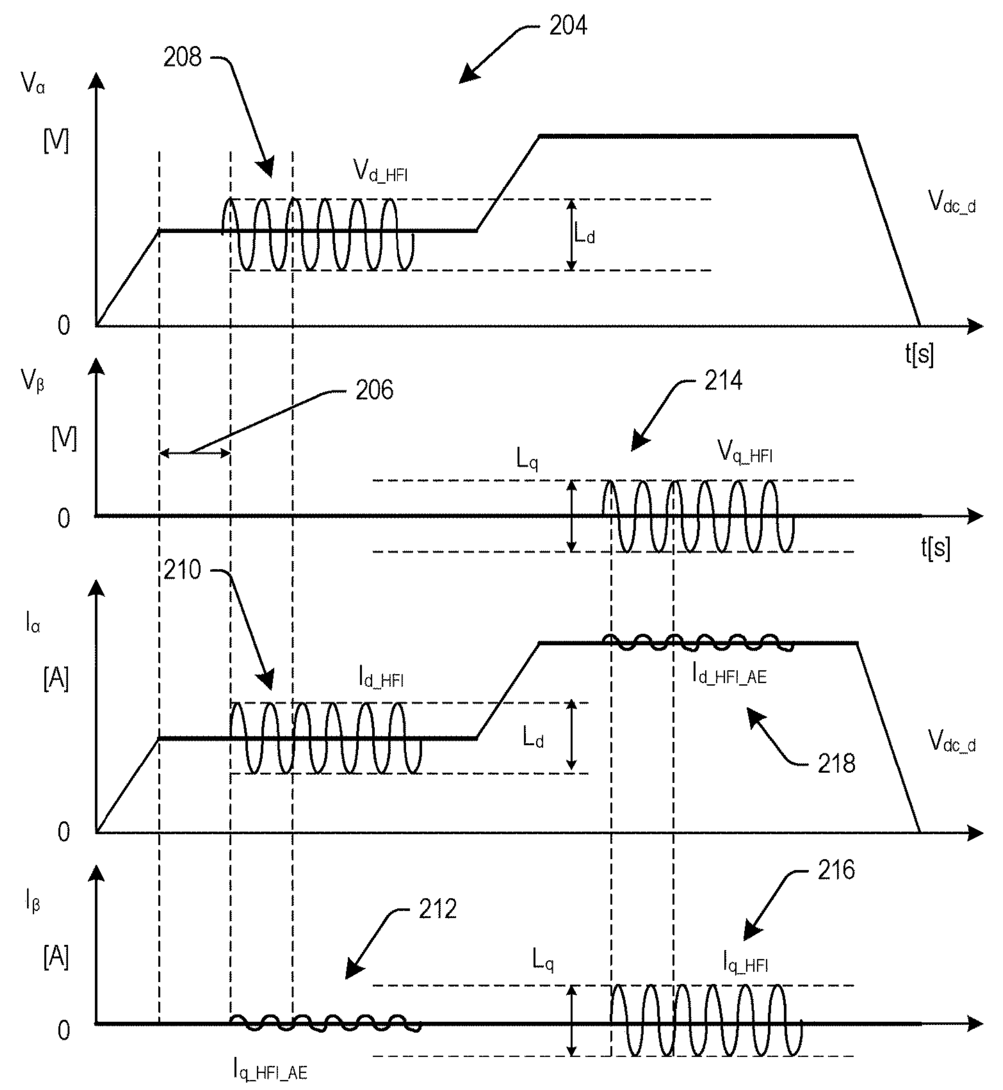

MOTOR CONTROLLER

TECHNICAL FIELD

The present disclosure relates generally to motor control.

BACKGROUND

Permanent Magnet Synchronous Motors (PMSMs) are employed in consumer and industrial motor applications due to their higher reliability and smaller size compared to other types of motors. To achieve high efficiency and low vibration and acoustic noise, Field-Oriented Control (FOC) techniques are often used in consumer and industrial PMSM control for fans, pumps, compressors, geared motors, and the like.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a method for controlling a motor comprises applying a high frequency injection signal to a motor during a start-up mode, extracting a motor parameter based on a measured response to the high frequency injection signal, determining an alignment error of the motor based on the measured response, correcting the motor parameter based on the alignment error to generate a corrected motor parameter, and controlling the motor during a control mode based on the corrected motor parameter.

According to some embodiments, a motor controller comprises a first controller operating in a start-up mode and configured to apply a high frequency injection signal to a motor, extract a motor parameter based on a measured response to the high frequency injection signal, determine an alignment error of the motor based on the measured response, and correct the motor parameter based on the alignment error to generate a corrected motor parameter, and a second controller operating in a control mode and configured to control the motor based on the corrected motor parameter.

According to some embodiments, a system comprises a motor, a current sense unit configured to measure current in the motor, a transform unit configured to generate, based on the current, a first current signal corresponding to a first control axis and a second current signal corresponding to a second control axis, a first controller operating in a start-up mode and configured to apply a high frequency injection signal on the first control axis and the second control axis, extract a motor parameter based on responses to the high frequency injection signal measured in the first current signal and the second current signal, determine an alignment error of the motor based on the responses to the high frequency injection signal measured in the first current signal and the second current signal, and correct the motor parameter based on the alignment error to generate a corrected motor parameter, and a second controller operating in a control mode and configured to control the motor based on the corrected motor parameter.

According to some embodiments, a system for controlling a motor comprises means for applying a high frequency injection signal to a motor during a start-up mode, means for extracting a motor parameter based on a measured response to the high frequency injection signal, means for determining an alignment error of the motor based on the measured response, means for correcting the motor parameter based on the alignment error to generate a corrected motor parameter, and means for controlling the motor during a control mode based on the corrected motor parameter.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIGS. 2 and 3 are diagrams illustrating parameter extraction during a start-up mode of a motor, in accordance with some embodiments.

DETAILED DESCRIPTION

Figure 1:
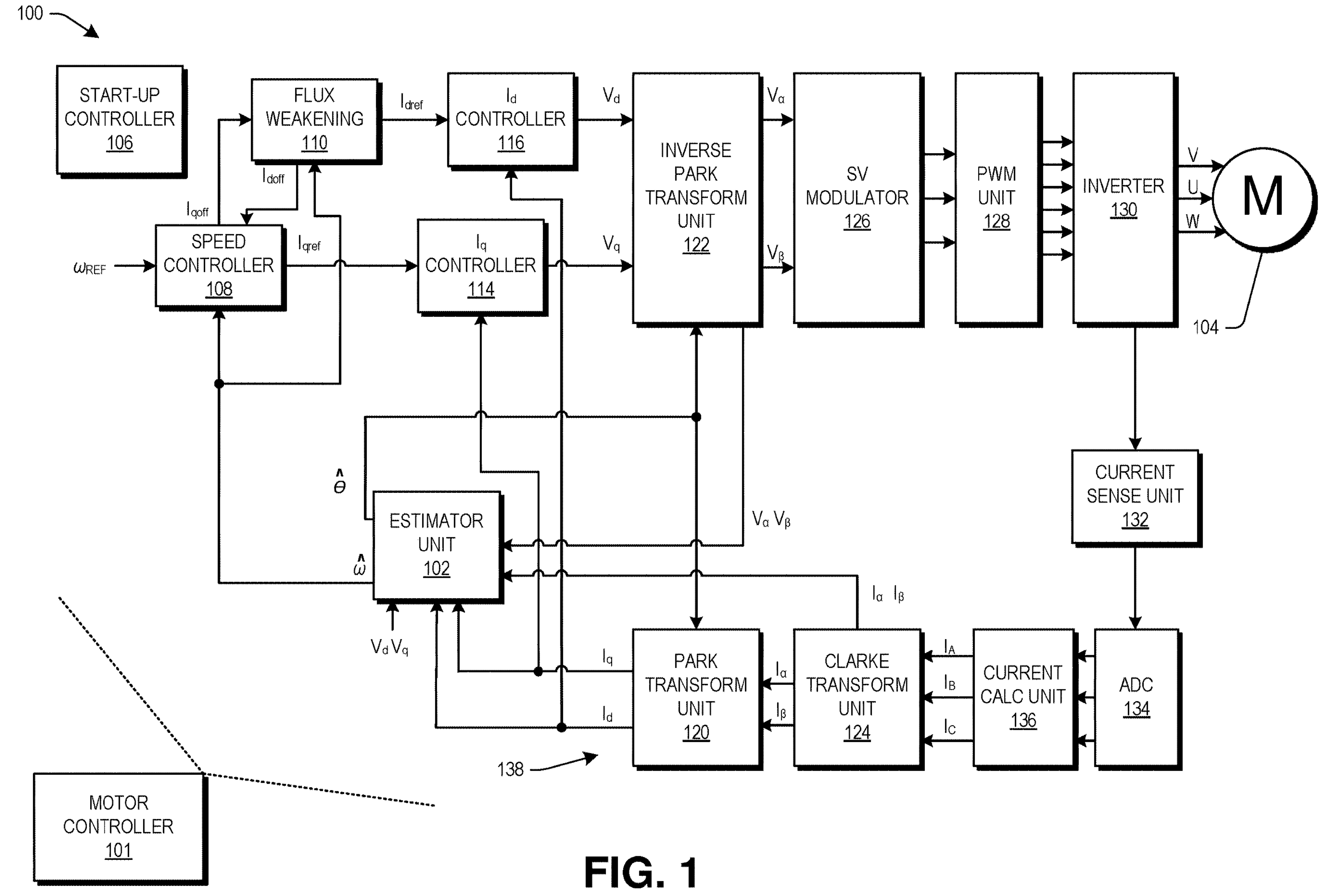
FIG. 1 is a schematic diagram of a motor controller, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

In addition to motor control functions, the processing time of a microcontroller used in a motor controller is also shared to provide user interfaces and other functionality. Providing motor control without computationally intensive techniques, such as transforms requiring quadric equations, allows increased functionality to be provided in systems with reduced complexity, lower cost microcontrollers.

Field-Oriented Control (FOC) is a method of variable speed control for three-phase alternating current (AC) electric motors to improve power efficiency with fast control response over a full range of motor speeds. Various implementations of structures, components, and techniques for providing control of three-phase AC motors are discussed herein. Structures, components, and techniques are discussed with reference to example three-phase Permanent Magnet Synchronous Motor (PMSM) devices and control systems. However, this application is not intended to be limiting, and is for ease of discussion and illustrative convenience. The techniques and devices discussed may be applied to other motor designs, control structures, and the like (e.g., single-phase and three-phase variable frequency drives, digital phase converters, three-phase and single-phase motors, induction motors, regenerative drives, etc.), and remain within the scope of the disclosure.

FIG. 1 is a schematic diagram of a motor system 100, according to some embodiments. The motor system 100 comprises a motor controller 101 employing a sensorless topology that uses an estimator unit 102 to estimate a rotor position, $\hat{\theta}$, and a rotor speed, $\hat{\omega}$, to support FOC techniques for controlling a motor 104. In some embodiments, the estimator unit 102 may also estimate flux, torque, or back EMF. In some embodiments, the motor controller 101 estimates a motor parameters, such as phase resistance ($R_s$), synchronous inductance of motor winding in d-axis ($L_d$), or synchronous inductance of motor winding in q-axis ($L_q$), for use in controlling the motor 104.

Rotor speed is indicative of motor speed. To implement FOC control, the motor controller 101 uses a Park transform and an Inverse Park Transform to convert between a d-q rotor fixed reference frame defined by a torque generating component, q, and a flux generating component, d, and an α-β stationary reference frame.

The Park Transform converts orthogonal stationary reference frame currents to flux generating and torque generating currents using the equations:

$$I_d = 1_\propto * \cos(\theta) + I_\beta * \sin(\theta) \text{ and}$$

$$I_q = I_\beta * \cos(\theta) - I_\propto * \sin(\theta).$$

The Inverse Park Transform converts orthogonal stationary reference frame voltages to phase voltage using the equations:

$$V_a = V_\propto$$

$$V_b = \frac{-V_\propto + \sqrt{3} * V_\beta}{2} \text{ and}$$

$$V_c = \frac{-V_\propto - \sqrt{3} * V_\beta}{2}.$$

A Clarke transform to convert between a three-phase reference frame defined by V, U, and W components and the α-β stationary reference frame using the equations:

$$I_\propto = \frac{2}{3}(I_a) - \frac{1}{3}(I_b - I_c) \text{ and}$$

$$I_\beta = \frac{2}{\sqrt{3}}(I_b - I_c).$$

The motor controller 101 comprises a start-up controller 106 that injects high frequency (AC) signals to characterize the motor 104 during a start-up mode of the motor 104. The start-up controller 106 injects an AC signal on one of the control axis signals, such as the $V_d$ control signal or the or the $V_q$ control signal and measures current responses on the q-axis and the d-axis to determine parameters of the motor 104, such as $R_s$, $L_d$, or $L_q$. During control mode operation, a speed controller 108 receives a reference speed, $\omega_{ref}$, representing a desired rotational speed for the motor 104 and an estimated rotor speed, $\hat{\omega}$, from the estimator unit 102 as inputs. In some embodiments, the speed controller 108 is a proportional-integral (PI) controller that operates to drive the error between the inputs to zero. An $I_q$ controller 114 receives an $I_{qref}$ signal from speed controller 108 and a feedback torque generating current parameter ($I_q$). In some embodiments, the $I_q$ controller 114 is a proportional-integral (PI) controller that operates to drive the error between its inputs to zero.

A flux weakening unit 110 receives the estimated rotor speed, $\hat{\omega}$, from the estimator unit 102 and an $I_q$ reference offset parameter, $I_{qoff}$, from the speed controller 108 for motor torque adjustment and generates a reference flux generating current parameter ($I_{dref}$). The flux weakening unit 110 generates an $I_d$ reference offset parameter, $I_{doff}$, for the speed controller 108 which is required when the motor Back-EMF is greater than the output voltage of the inverter 130 limited by the DC input (i.e. battery) to the inverter 130. An $I_d$ controller 116 receives the reference flux generating current parameter ($I_{dref}$) and a feedback flux generating current parameter ($I_d$) as inputs. In some embodiments, the $I_d$ controller 116 is a proportional-integral (PI) controller that operates to drive the error between its inputs to zero. The $I_q$ controller 114 outputs a demand torque generating voltage parameter, $V_q$, and the $I_d$ controller 116 outputs a demand flux generating voltage parameter, $V_d$. The flux generating component $I_d$ may be controlled to zero responsive to the flux weakening unit 110 providing an $I_{dref}$ value of zero. The flux generating component $I_d$ may be controlled by the flux weakening unit 110 using a negative $I_{dref}$ value to implement flux-weakening control to extend the operating speed range of the motor 104 or using a positive an $I_{dref}$ value to implement flux-boosting control.

In some embodiments, the speed controller 108 is not used and the $I_q$ controller 114 $I_d$ controller 116 operate in the control mode using an open loop configuration, such as an I/F control open loop configuration.

The motor controller 101 comprises a Park transform unit 120, an inverse Park transform unit 122, and a Clarke transform unit 124 to convert between reference frames. The Park transform unit 120 transforms the α-β stationary reference frame to the d-q rotor fixed reference frame. The inverse Park transform unit 122 transforms the d-q rotor fixed reference frame to the α-β stationary reference frame. The Clarke transform unit 124 transforms the three-phase reference frame to the α-β stationary reference frame.

The inverse Park transform unit 122 receives the demand torque generating voltage parameter, $V_q$, from the $I_q$ controller 114 and the demand flux generating voltage parameter, $V_d$, from the $I_d$ controller 116 and generates stationary frame voltage parameters, $V_\alpha$, $V_\beta$, as inputs to a space vector modulator 126. The amplitude and angle of the voltage vector defined by $V_\alpha$ and $V_\beta$ provide a reference voltage for the space vector modulator 126 for controlling a pulse width modulation (PWM) unit 128 to generate three-phase sinusoidal waveform output signals to drive an inverter 130. The output signals of the inverter 130 drive the phases of the motor 104. In some embodiments, the inverter 130 comprises a three-phase two-level voltage inverter.

A current sense unit 132 senses phase currents of the motor 104. In some embodiments, the current sense unit 132 comprises three shunt resistors associated with the three legs of the inverter 130 to sense the current of each phase of the motor 104. In some embodiments, two shunt resistors are used to sense the current of two phases of the motor 104. The current from the third phase of the motor 104 may be calculated based on the relationship $I_A+I_B+I_C=0$. In some embodiments, a single shunt resistor is inserted into to a DC link of the inverter 130 to sense a DC link current, and a three-phase current reconstruction is used to obtain the current information for each phase of the motor 104.

An analog-to-digital converter (ADC) 134 receives the sensed voltages from the current sense unit 132 to generate digital inputs for a current calculation unit 136. The current calculation unit 136 generates phase current measurement parameters, $I_A$, $I_B$, and $I_C$. The phase current measurement parameters are provided to the Clarke transform unit 124 to generate α-β stationary reference frame feedback current parameters, $I_\alpha$, $I_\beta$. The stationary reference frame feedback current parameters are provided to the Park transform unit 120 to generate a feedback torque generating current parameter, $I_q$, and a feedback flux generating current parameter, $I_d$. The current calculation unit 136, Clarke transform unit 124, and Park transform unit 120 comprise a feedback unit 138 for generating the feedback torque generating current parameter, $I_q$, and the feedback flux generating current parameter, $I_d$.

The estimator unit 102 estimates the rotor position, $\hat{\theta}$, and the rotor speed, $\hat{\omega}$. The estimator unit 102 may use various techniques for estimating rotor position and speed. Inputs to the estimator unit 102 may include $I_q$ from the $I_q$ controller 114, $I_d$ from the $I_d$ controller 116, $I_q$ and $I_d$ from the Park transform unit 120, $V_\alpha$ and $V_\beta$ from the inverse Park transform unit 122, or $I_\alpha$ and $I_\beta$ from the Clarke transform unit 124, depending on the selected estimation technique.

The dynamic d-q axis voltage equations for a PMSM are:

$$V_d = R_s I_d - \omega_e L_q I_q + L_d \frac{dI_d}{dt} \text{ and} \tag{1}$$

$$V_q = R_s I_q + \omega_e L_d I_d + L_q \frac{dI_q}{dt} + \omega_e k_e, \tag{2}$$

where:

$V_d$—Flux generating voltage $V_q$—Torque generating voltage $R_s$—Motor phase resistance $L_d$—Synchronous inductance of motor winding in d-axis $L_q$—Synchronous inductance of motor winding in q-axis $I_q$—Torque generating current $I_d$—Flux generating current $k_e$—Back EMF constant $\omega_e$—Rotor electrical speed (motor speed×number of pole pair)

Figure 3:
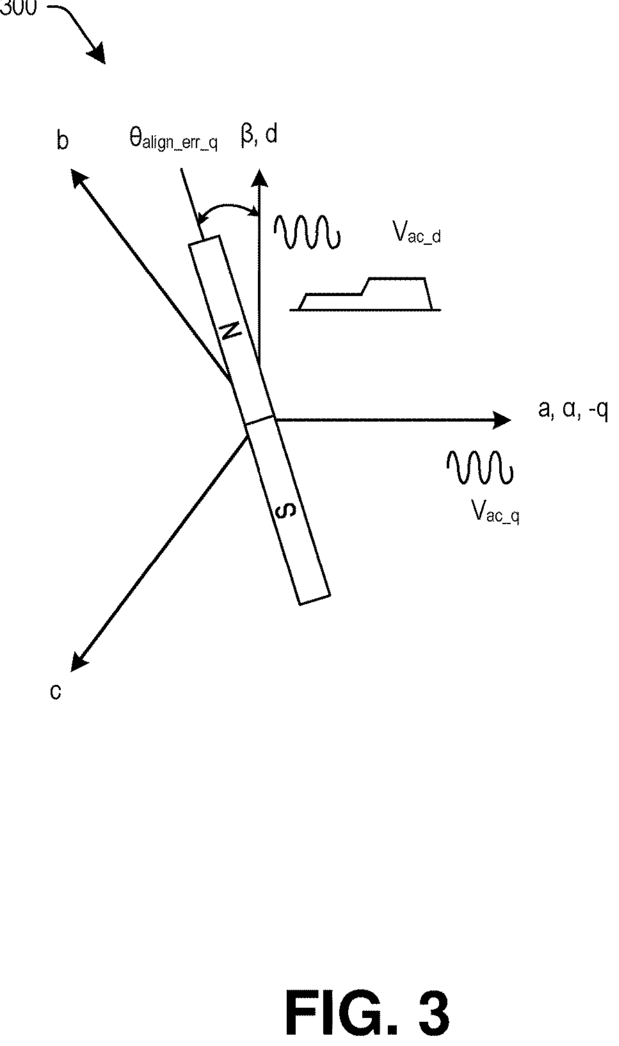
Figure 3:
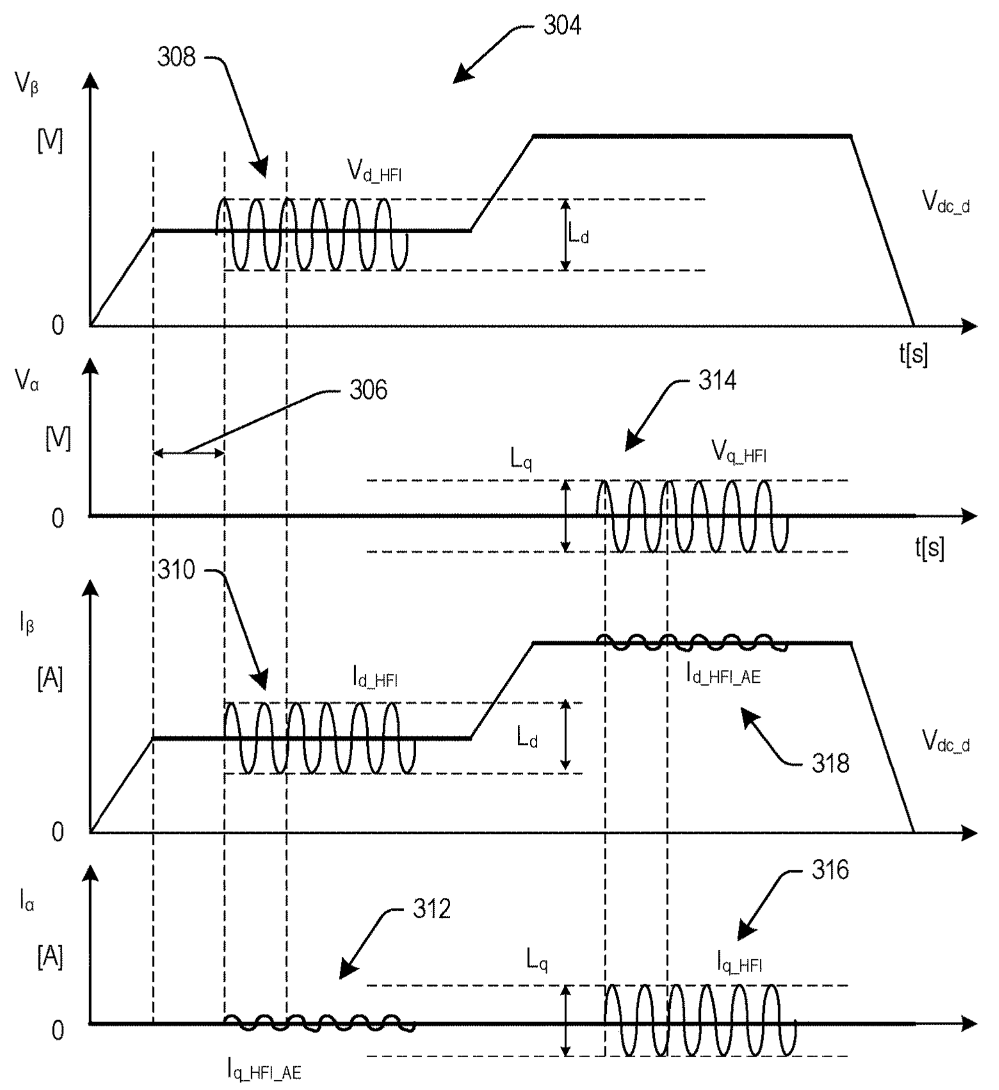
Figure 4:
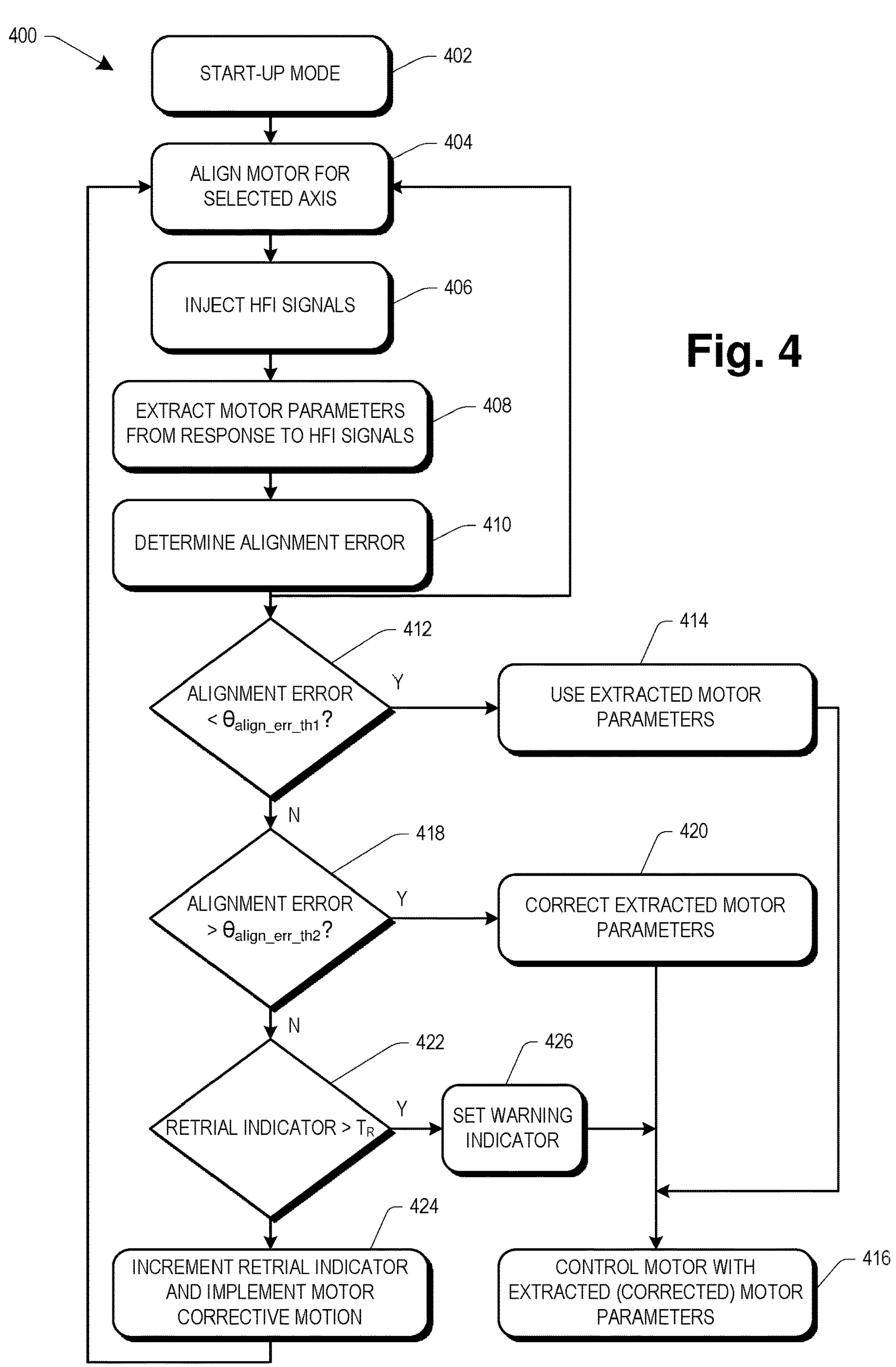
FIG. 4 illustrates a method of controlling a motor, in accordance with some embodiments.

FIGS. 2 and 3 are diagrams 200, 300 illustrating a start-up mode of the motor 104, in accordance with some embodiments. FIG. 4 illustrates a method 400 of controlling the motor 104, in accordance with some embodiments. The method 400 is described in reference to FIGS. 2 and 3.

At 402, the motor 104 enters a start-up mode. The start-up mode is controlled by the start-up controller 106. During the start-up mode, the start-up controller 106 generates d-q frame voltage signals and measures the response in the α-β frame to extract motor parameters. At 404, the motor 104 is aligned for a selected axis. Referring to FIG. 2, a phasor diagram 202 of the motor 140 and waveforms 204 for $V_\alpha$, $V_\beta$, $I_\alpha$, and $I_\beta$ are shown for an alignment process in the d-axis. At 404, the start-up controller 106 sets an initial angle of 0 degrees for d-axis alignment, as shown in the phasor diagram 202. An alignment error ($\theta_{align\_err\_d}$) represents misalignment between the actual rotor position and the position setpoint in the d-axis alignment. The start-up controller 106 applies a DC voltage ($V_{dc\_d}$) to the d-axis to move the motor 104 to the setpoint position during a first start-up interval.

After a stabilization interval 206 to allow the motor 104 to move to the setpoint position, the start-up controller 106 injects a high frequency signal 208 ($V_{d\_HFI}$) at 408 with a frequency of $\omega_{HFI}$ on the d-axis as seen in the $V_\alpha$ signal. A response 210 ($I_{d\_HFI}$) on the q-axis is seen in the $I_\alpha$ signal. Due to the alignment error ($\theta_{align\_err\_d}$), a high frequency injection current 212 ($I_{q\_HFI\_AE}$) is induced on the q-axis as seen in the $I_\beta$ signal. If there was no alignment error, there would be no $I_{q\_HFI\_AE}$ current present in the $I_\beta$ signal.

In a second start-up interval, the start-up controller 106 increases the DC voltage ($V_{dc\_d}$) and injects a high frequency signal 214 ($V_{q\_HFI}$) with a frequency of $\omega_{HFI}$ on the Q-axis. A response 216 ($I_{q\_HFI}$) on the q-axis is seen in the $I_\beta$ signal. Due to the alignment error ($\theta_{align\_err\_d}$), a high frequency injection current 218 ($I_{d\_HFI\_AE}$) is induced ion the q-axis as seen in the $I_\alpha$ signal.

Based on the waveforms 204, the start-up controller 106 extracts parameters of the motor 104 for the d-axis alignment at 408. The amplitude of the high frequency signal 208 ($V_{d\_HFI}$) and the amplitude of the response 210 ($I_{d\_HFI}$) represent the synchronous inductance of the motor winding in the d-axis ($L_d$). The amplitudes are determined by integrating the instantaneous α and β axis currents and voltages:

$$L_{d\_d\_align} \approx V_{d\_HFI\_amp} / (I_{d\_HFI\_amp} \cdot \omega_{HFI})$$

$$L_{d\_d\_align} = \left(\sum V_{d\_HFI}[k]\right) / \left(\sum I_{d\_HFI}[k] \cdot \omega_{HFI}\right).$$

The amplitude of the high frequency signal 214 ($V_{q\_HFI}$) and the amplitude of the response 216 ($I_{q\_HFI}$) represent the synchronous inductance of the motor winding in the q-axis ($L_q$):

$$L_{q\_d\_align} \approx V_{q\_HFI\_amp} / (I_{q\_HFI\_amp} \cdot \omega_{HFI})$$

$$L_{q\_d\_align} = \left(\sum V_{q\_HFI}[k]\right) / \left(\sum I_{q\_HFI}[k] \cdot \omega_{HFI}\right).$$

The start-up controller determines the resistance using average signal values by:

$$R_{s\_d\_align} \approx (V_{q\_HFI\_avg2} - V_{d\_HFI\_avg1}) / (I_{d\_HFI\_avg2} - I_{d\_HFI\_avg1})$$

$R_{s\_d\_align}$={(Σ$V_{d_HFI2}$[k]−(Σ$V_{d_HFI1}$[k])}/{(Σ$I_{d_HFI2}$[k]−(Σ$I_{d_HFI1}$[k])}. In some embodiments, the start-up controller 106 calculates components of the motor misalignment at 410 using the amplitudes of the injection signals $I_{d\_HFI}$ and $I_{q\_HFI}$ and the amplitudes of the resulting alignment error signals $I_{d\_HFI\_AE}$ and $I_{q\_HFI\_AE}$ abd combines the components according to:

$$\theta_{align\_err\_d1} = \operatorname{atan2}(I_{q\_HFI\_AE\_}amp / I_{d\_HFI\_}amp)$$

$$\theta_{align\_err\_d2} = \operatorname{atan2}(I_{d\_HFI\_AE\_}amp / I_{q\_HFI\_}amp)$$

$$\theta_{align\_err\_d} = 0.5 \cdot (\theta_{align\_err\_d1} + \theta_{align\_err\_d2}).$$

Referring to FIG. 3, the start-up controller 106 repeats 404-410 for the q-axis. FIG. 3 shows a phasor diagram 302 of the motor 140 and d-q waveforms 304 for $V_\alpha$, $V_\beta$, $I_\alpha$, and $I_\beta$ are shown for an alignment process in the q-axis. In FIG. 3, the start-up controller 106 sets an initial angle of 90 degrees for q-axis alignment at 404, as shown in the phasor diagram 302. An alignment error ($\theta_{align\_err\_q}$) represents misalignment between the actual rotor position and the position setpoint in the q-axis alignment.

The start-up controller 106 applies a DC voltage ($V_{dc\_d}$) to the d-axis to move the motor 104 to the setpoint position during a third start-up interval. After a stabilization interval 306 to allow the motor 104 to move to the setpoint position, the start-up controller 106 injects a high frequency signal

308 ($V_{d\_HFI}$) at 406 with a frequency of $\omega_{HFI}$ on the d-axis as seen in the $V_\beta$ signal. A response 310 ($I_{d\_HFI}$) on the q-axis is seen in the $I_\beta$ signal. Due to the alignment error ($\theta_{align\_err\_q}$), a high frequency injection current 312 ($I_{q\_HFI\_AE}$) is induced in the $I_\alpha$ signal. If there was no alignment error, there would be no $I_{q\_HFI\_AE}$ current present in the $I_\alpha$ signal.

In a fourth start-up interval, the start-up controller 106 increases the DC voltage ($V_{dc\_d}$) and injects a high frequency signal 314 ($V_{q\_HFI}$) with a frequency of $\omega_{HFI}$ on the q-axis. A response 316 ($I_{q\_HFI}$) on the q-axis is seen in the $I_\beta$ signal. Due to the alignment error ($\theta_{align\_err\_q}$), a high frequency injection current 318 ($I_{d\_HFI\_AE}$) is induced on the d-axis as seen in the $I_\beta$ signal.

Based on the waveforms 304, the start-up controller 106 extracts parameters of the motor 104 for the q-axis alignment at 408. The amplitude of the high frequency signal 308 ($V_{d\_HFI}$) and the amplitude of the response 310 ($I_{d\_HFI}$) represent the synchronous inductance of the motor winding in the d-axis ($L_d$). The amplitudes are determined by integrating the instantaneous d and q axis currents and voltages:

$$L_{d\_q\_align} \approx V_{d\_HFI\_amp}/(I_{d\_HFI\_amp} \cdot \omega_{HFI})$$

$$L_{d\_q\_align} = \left(\sum V_{d\_HFI}[k]\right)/\left(\sum I_{d\_HFI}[k] \times \omega_{HFI}\right).$$

The amplitude of the high frequency signal 314 ($V_{q\_HFI}$) and the amplitude of the response 316 ($I_{q\_HFI}$) represent the synchronous inductance of the motor winding in the q-axis ($L_q$).

$$L_{q\_q\_align} \approx V_{q\_HFI\_amp}/(I_{q\_HFI\_amp} \cdot \omega_{HFI})$$

$$L_{q\_q\_align} = \left(\sum V_{q\_HFI}[k]\right)/\left(\sum I_{q\_HFI}[k] \times \omega_{HFI}\right).$$

The start-up controller determines the resistance by using average signal values of the components by:

$$R_{s\_q\_align} \approx (V_{q\_HFI\_avg2} - V_{q\_HFI\_avg1})/(I_{q\_HFI\_avg2} - I_{q\_HFI\_avg1})$$

$$R_{s\_q\_align} \approx \left\{\left(\sum V_{q\_HFI2}[k] - \left(\sum V_{q\_HFI1}\ [k]\right\}/\left\{\left(\sum I_{q\_HFI2}[k] - \left(\sum I_{q\_HFI1}\ [k]\right\}.$$

In some embodiments, the start-up controller 106 calculates the motor misalignment at 410 using the amplitudes of the injection signals $I_{d\_HFI}$ and $I_{q\_HFI}$ and the amplitudes of the resulting alignment error signals $I_{d\_HFI\_AE}$ and $I_{q\_HFI\_AE}$ according to:

$$\theta_{align\_err\_q1} = \operatorname{atan2}\left(I_{q\_HFI\_AE\_}amp/I_{d\_HFI\_}amp\right)$$

$$\theta_{align\_err\_q2} = \operatorname{atan2}\left(I_{d\_HFI\_AE\_}amp/I_{q\_HFI\_}amp\right)$$

$$\theta_{align\_err\_q} = 0.5 \cdot (\theta_{align\_err\_q1} + \theta_{align\_err\_q2}).$$

The start-up controller 106 averages the components of the motor parameters extracted during the d-axis alignment and the components of the motor parameters extracted during the q-axis alignment according to:

$$L_d = 0.5 \cdot (L_{d\_d\_align} + L_{d\_q\_align})$$

$$L_d = 0.5 \cdot (L_{q\_d\_align} + L_{q\_q\_align})$$

$$R_s = 0.5 \cdot (R_{s\_d\_align} + R_{s\_q\_align})$$

$$\theta_{align\_err} = 0.5 \cdot (\theta_{align\_err\_d} + \theta_{align\_err\_q}).$$

The alignment error affects the accuracy of the motor inductance parameters. In some embodiments, the start-up controller 106 compares the calculated alignment error to error thresholds ($\theta_{align\_err\_th1}$ and $\theta_{align\_err\_th2}$). If the absolute value of the alignment error is less than the first error threshold ($\theta_{align\_err\_th1}$) at 412, the start-up controller 106 uses the extracted motor parameters, $R_s$, $L_d$, and $L_q$ without correction at 414, and the motor controller 101 controls the motor 104 based on the extracted motor parameters at 416.

If the absolute value of the alignment error is not greater than the second error threshold ($\theta_{align\_err\_th2}$) at 418 (i.e., the alignment error is between the first error threshold ($\theta_{align\_err\_th1}$) and the second error threshold ($\theta_{align\_err\_th2}$)), the start-up controller 106 corrects the motor parameters at 420 based on the measured alignment error according to:

$$L_{d\_corr} = V^*_{d\_HFI\_amp}\ \cos\ (\theta_{align\_err})/(\omega_{HFI} \cdot I_{d\_HFI\_amp})$$

$$L_{q\_corr} = V^*_{q\_HFI\_amp}\ \cos\ (\theta_{align\_err})/(\omega_{HFI} \cdot I_{q\_HFI\_amp}).$$

Since we already calculated $L_d$ and $L_q$ above, shouldn't the correction be:

$$L_{d\_corr} = L_d \cdot \cos\ (\theta_{align\_err})$$

$$L_{q\_corr} = L_q \cdot \cos\ (\theta_{align\_err}).$$

The motor controller 101 controls the motor based on the corrected motor parameters at 416.

If the absolute value of the alignment error is greater than the second error threshold ($\theta_{align\_err\_th2}$) at 418, the start-up controller 106 determines if a retrial indicator is greater than a threshold ($T_R$) at 422. If the retrial indicator is not greater than the threshold ($T_R$), the start-up controller 106 implements a motor corrective motion and increments the retrial indicator at 424. In one example, the start-up controller 106 implements open-loop I/F rotation for a specified number of electrical rotational cycles using current control tuned using the imperfectly corrected motor parameters. After the open-loop I/F rotation, the start-up controller 106 returns to 404 and repeats the parameter extraction process as described in FIGS. 2 and 3. If the subsequently determined alignment error still exceeds the second error threshold ($\theta_{align\_err\_th2}$), the start-up controller 106 repeats the motor motion corrective motion, increments the retrial indicator, and iterates the parameter extraction process again. If the retrial indicator exceeds the retrial threshold ($T_R$) at 422, the start-up controller 106 sets a warning indicator at 426, such as a visual indicator, an audible indicator, an email message, or some other warning indicator, that indicates that suboptimal motor parameter estimates are being used for motor control and the motor response may be degraded. The motor controller 101 controls the motor 104 at 416 with the corrected, but suboptimal, motor parameters. A user of the motor 104 may choose to continue with the suboptimal control or implement a manual alignment adjustment process.

In some embodiments, the start-up controller 106 configures the motor controller 101 to control the motor 104 based on the extracted motor parameters. Various control parameters may be configured depending on the particular motor control techniques implements by the motor controller 101. The proportional and integral gain parameter for the current loops controlled by the $I_q$ controller 114 and the $I_d$ controller 116 may be set depending on the measured phase resistance ($R_s$) and the cutoff frequency ($f_c$) according to:

$$Kp_d = 2\pi \cdot f_c \cdot L_d$$

$$Kp_q = 2\pi \cdot f_c \cdot L_q$$

$$Ki_d = Ki_q = 2\pi \cdot f_c \cdot R_s.$$

In some embodiments, the estimator unit 102 estimates positon, speed, estimate flux, torque, or back EMF. In some embodiments, the speed controller 108 is not used and the motor controller 101 implements I/F control by operating the $I_q$ controller 114 and the $I_d$ controller 116 in an open loop configuration. The motor speed is determined by the open-loop position by time weighted integration of the intended speed every current control period at which the $I_q$ controller 114 and the $I_d$ controller 116 are run.

The estimator unit 102 may estimate torque by:

$$\text{Tem\_est} = \frac{3}{2}\frac{\text{Poles}}{2}(\lambda pm + (L_d - L_q)I_d)I_q[Nm],$$

where λpm is the flux induced by the permanent magnets in the stator windings and Poles is the number of pole pairs.

The estimator unit 102 may estimate stator flux for stator flux FOC by:

$$\lambda s\alpha\text{\_est} = \int (V_\alpha - R_s I_\alpha)$$

$$\lambda s\beta\text{\_est} = \int (V_\beta - R_s I_\beta)$$

$$\lambda sd_{est} = \lambda pm + L_d I_d [V \cdot s]$$

$$\lambda sq_{est} = L_q I_q [V \cdot s].$$

The estimator unit 102 may estimate rotor flux for rotor FOC by:

$$\lambda r\alpha_{est} = \lambda s\alpha\text{\_est} - L_q I_\alpha [V \cdot s]$$

$$\lambda r\alpha\text{\_est} = \lambda s\beta\text{\_est} - L_q I_\beta [V \cdot s].$$

The estimator unit 102 may estimate back EMF for rotor FOC by:

$$BEMF_{est} = \lambda pm + \omega(L_d - L_q)I_d - (L_d - L_q)p \cdot I_q\ [V],$$

where ω is rotor electrical speed [rad/s] and p is the rotor magnet pole pair number.

Furthermore, some of the disclosed techniques may be readily implemented in software using object or object-oriented software development environments that provide portable source code that can be used on a variety of computer or workstation platforms. Alternatively, the disclosed techniques and/or arrangements may be implemented partially or fully in hardware using standard logic circuits or VLSI design. In some embodiments, the motor 104, the inverter 130, current sense unit 132, and the ADC 134 are hardware-implemented and the remaining units in FIG. 1 are software implemented. However, other combinations of hardware, firmware, or software are contemplated.

Moreover, the disclosed procedures may be readily implemented in software that can be stored on a computer-readable storage medium (such as a memory storage device), executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

Figure 5:
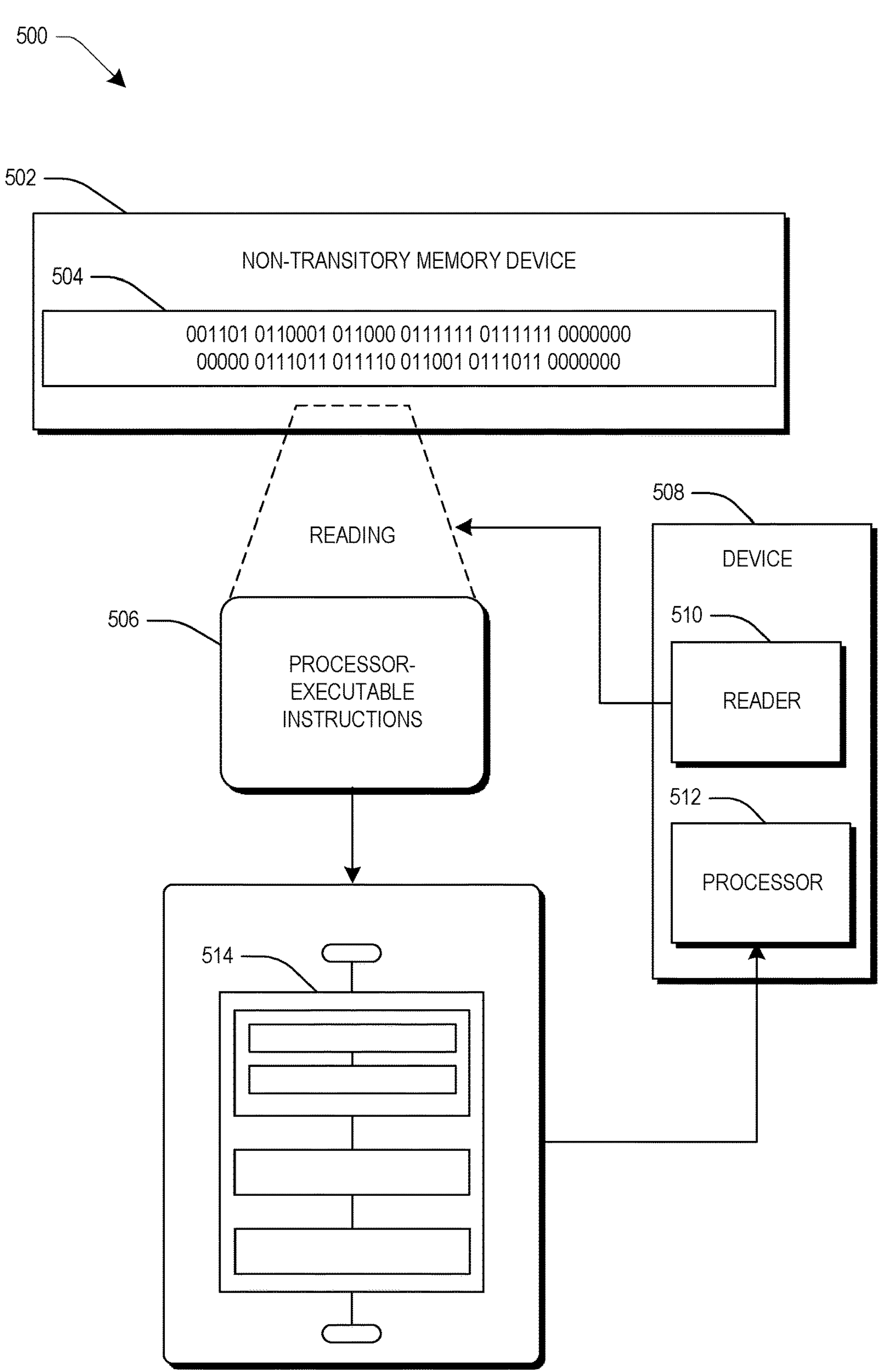
FIG. 5 illustrates an exemplary computer-readable medium, in accordance with some embodiments.

FIG. 5 illustrates an exemplary embodiment 500 of a computer-readable medium 502, according to some embodiments. One or more embodiments involve a computer-readable medium comprising processor-executable instructions configured to implement one or more of the techniques presented herein. The embodiment 500 comprises a non-transitory computer-readable medium 502 (e.g., a CD-R, DVD-R, flash drive, a platter of a hard disk drive, etc.), on which is encoded computer-readable data 504. This computer-readable data 504 in turn comprises a set of processor-executable computer instructions 506 that, when executed by a computing device 508 including a reader 510 for reading the processor-executable computer instructions 506 and a processor 512 for executing the processor-executable computer instructions 506, are configured to facilitate operations according to one or more of the principles set forth herein. In some embodiments, the processor-executable computer instructions 506, when executed, are configured to facilitate performance of a method 514, such as at least some of the aforementioned method(s). In some embodiments, the processor-executable computer instructions 506, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

According to some embodiments, a method for controlling a motor comprises applying a high frequency injection signal to a motor during a start-up mode, extracting a motor parameter based on a measured response to the high frequency injection signal, determining an alignment error of the motor based on the measured response, correcting the motor parameter based on the alignment error to generate a corrected motor parameter, and controlling the motor during a control mode based on the corrected motor parameter.

According to some embodiments, determining the alignment error comprises determining a first component of the alignment error during a first interval, determining a second component of the alignment error during a second interval, and combining the first component of the alignment error and the second component of the alignment error.

According to some embodiments, applying the high frequency injection signal comprises applying the high frequency injection signal on a first control axis during the first interval, and applying the high frequency injection signal on a second control axis during a second interval, and extracting the motor parameter comprises determining a first control axis inductance parameter during the first interval, and determining a second control axis inductance parameter during the second interval.

According to some embodiments, the method comprises aligning the motor to a first position during the first interval, and aligning the motor to a second position during the second interval, wherein extracting the motor parameter comprises determining a first component of an inductance parameter during the first interval, determining a second component of the inductance parameter during the second interval, and combining the first component of the inductance parameter and the second component of the inductance parameter to generate the motor parameter prior to correcting the motor parameter.

According to some embodiments, controlling the motor comprises configuring a gain parameter of a controller based on the corrected motor parameter, and generating a drive signal for the motor using the controller configured with the gain parameter.

According to some embodiments, controlling the motor comprises determining a feedback parameter based on the motor parameter, and controlling the motor based on the feedback parameter.

According to some embodiments, determining the feedback parameter comprises estimating at least one of torque, stator flux, rotor flux, or back EMF of the motor based on the motor parameter.

According to some embodiments, the method comprises, responsive to the alignment error exceeding a first threshold, rotating the motor and iterating the applying of the high frequency injection signal, the extracting of the motor parameter, the determining of the alignment error, and the correcting of the motor parameter.

According to some embodiments, the method comprises generating a warning indictor responsive to iterating the applying of the high frequency injection signal, the extracting of the motor parameter, the determining of the alignment error, and the correcting of the motor parameter a number of times greater than a retrial threshold.

According to some embodiments, the method comprises aligning the motor to a first position, wherein applying the high frequency injection signal comprises applying the high frequency injection signal in a d-axis voltage signal during a first interval with the motor at the first position, the measured response comprises a first response of a d-axis current signal during the first interval, and a second response of a q-axis current signal during the first interval, extracting the motor parameters comprises determining a first component of a d-axis inductance of the motor based on the first component of the high frequency injection signal and the first response, and determining the alignment error comprises determining a first component of a d-axis alignment error based on the first response and the second response.

According to some embodiments, applying the high frequency injection signal comprises injecting a second component of the high frequency injection signal on a q-axis voltage signal during a second interval with the motor at the first position, the measured response comprises a third response of the q-axis current signal during the second interval, and a fourth response of the d-axis current signal during the second interval, extracting the motor parameters comprises determining a first component of a q-axis inductance of the motor based on the second component of the high frequency injection signal and the third response, and determining a d-axis resistance of the motor based on the first component of the high frequency injection signal, the second component of the high frequency injection signal, the first response, and the third response, and determining the alignment error comprises determining a second component of d-axis alignment error based on the third response and the fourth response, and combining the first component of the d-axis alignment error and the second component of the d-axis alignment error to determine the d-axis alignment error.

According to some embodiments, the method comprises aligning the motor to a second position, wherein applying the high frequency injection signal comprises injecting a third component of the high frequency injection signal on the d-axis voltage signal during a third interval with the motor at the second position, the measured response comprises a fifth response of the d-axis current signal during the third interval, and a sixth response of the q-axis current signal during the third interval, extracting the motor parameters comprises determining a second component of the d-axis inductance based on the third component of the high frequency injection signal and the fifth response, and combining the first component of the d-axis inductance and the second component of the d-axis inductance to determine the d-axis inductance, and determining the alignment error comprises determining a first component of a q-axis alignment error based on the fifth response and the sixth response.

According to some embodiments, applying the high frequency injection signal comprises injecting a fourth component of the high frequency injection signal on the q-axis voltage signal during a fourth interval with the motor at the second position, the measured response comprises a seventh response of the q-axis current signal during the fourth interval, and an eighth response of the d-axis current signal during the fourth interval, extracting the motor parameters comprises determining a second component of the q-axis inductance based on the fourth component of the high frequency injection signal and the seventh response, combining the first component of the q-axis inductance and the second component of the q-axis inductance to determine the q-axis inductance, determining a q-axis resistance of the motor based on the third component of the high frequency injection signal, the fourth component of the high frequency injection signal, the fifth response, and the seventh response, and combining the d-axis resistance and the q-axis resistance to determine a phase resistance of the motor, and determining the alignment error comprises determining a second component of the q-axis alignment error based on the seventh response and the eighth response, combining the first component of the q-axis alignment error and the second component of the q-axis alignment error to determine the q-axis alignment error, and combining the d-axis alignment error and the q-axis alignment error to determine the alignment error.

According to some embodiments, a motor controller comprises a first controller operating in a start-up mode and configured to apply a high frequency injection signal to a motor, extract a motor parameter based on a measured response to the high frequency injection signal, determine an alignment error of the motor based on the measured response, and correct the motor parameter based on the alignment error to generate a corrected motor parameter, and a second controller operating in a control mode and configured to control the motor based on the corrected motor parameter.

According to some embodiments, the first controller is configured to determine the alignment error by determining a first component of the alignment error during a first interval, determining a second component of the alignment error during a second interval, and combining the first component of the alignment error and the second component of the alignment error.

According to some embodiments, the first controller is configured to apply the high frequency injection signal by applying the high frequency injection signal on a first control axis during the first interval, and applying the high frequency injection signal on a second control axis during a second interval, and the first controller is configured to extract the motor parameter by determining a first control axis inductance parameter during the first interval, and determining a second control axis inductance parameter during the second interval.

According to some embodiments, the first controller is configured to align the motor to a first position during the first interval, align the motor to a second position during the second interval, and extract the motor parameter by determining a first component of an inductance parameter during the first interval, determining a second component of the inductance parameter during the second interval, and combining the first component of the inductance parameter and the second component of the inductance parameter to generate the motor parameter prior to correcting the motor parameter.

According to some embodiments, the second controller is configured to generate a drive signal for the motor using a gain parameter generated based on the corrected motor parameter.

According to some embodiments, the second controller is configured to determine a feedback parameter based on the motor parameter, and control the motor based on the feedback parameter.

According to some embodiments, the feedback parameter comprises at least one of torque, stator flux, rotor flux, or back EMF of the motor based on the motor parameter.

According to some embodiments, the first controller is configured to responsive to the alignment error exceeding a first threshold, rotate the motor and iterate the applying of the high frequency injection signal, the extracting of the motor parameter, the determining of the alignment error, and the correcting of the motor parameter.

According to some embodiments, the first controller is configured to generate a warning indictor responsive to iterating the applying of the high frequency injection signal, the extracting of the motor parameter, the determining of the alignment error, and the correcting of the motor parameter a number of times greater than a retrial threshold.

According to some embodiments, a system comprises a motor, a current sense unit configured to measure current in the motor, a transform unit configured to generate, based on the current, a first current signal corresponding to a first control axis and a second current signal corresponding to a second control axis, a first controller operating in a start-up mode and configured to apply a high frequency injection signal on the first control axis and the second control axis, extract a motor parameter based on responses to the high frequency injection signal measured in the first current signal and the second current signal, determine an alignment error of the motor based on the responses to the high frequency injection signal measured in the first current signal and the second current signal, and correct the motor parameter based on the alignment error to generate a corrected motor parameter, and a second controller operating in a control mode and configured to control the motor based on the corrected motor parameter.

According to some embodiments, the first controller is configured to responsive to the alignment error exceeding a first threshold, rotate the motor and iterate the applying of the high frequency injection signal, the extracting of the motor parameter, the determining of the alignment error, and the correcting of the motor parameter, and generate a warning indictor responsive to iterating the applying of the high frequency injection signal, the extracting of the motor parameter, the determining of the alignment error, and the correcting of the motor parameter a number of times greater than a retrial threshold.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally to be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc.

For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for controlling a motor comprising:
- applying a high frequency injection signal to a motor during a start-up mode;
- extracting a motor impedance parameter based on a measured response to the high frequency injection signal;
- determining an alignment error of the motor based on the measured response;
- correcting the motor impedance parameter based on the alignment error to generate a corrected motor impedance parameter; and
- controlling the motor during a control mode based on the corrected motor impedance parameter, wherein:
- determining the alignment error comprises:
  - determining a first component of the alignment error during a first interval;
  - determining a second component of the alignment error during a second interval; and
  - combining the first component of the alignment error and the second component of the alignment error.

2. The method of claim 1, wherein:
- applying the high frequency injection signal comprises:
  - applying the high frequency injection signal on a first control axis during the first interval; and
  - applying the high frequency injection signal on a second control axis during the second interval; and
- extracting the motor impedance parameter comprises:
  - determining a first control axis inductance parameter during the first interval; and
  - determining a second control axis inductance parameter during the second interval.

3. The method of claim 1, comprising:
- aligning the motor to a first position during the first interval; and
- aligning the motor to a second position during the second interval, wherein:
  - extracting the motor impedance parameter comprises:
    - determining a first component of an inductance parameter during the first interval;
    - determining a second component of the inductance parameter during the second interval; and
    - combining the first component of the inductance parameter and the second component of the inductance parameter to generate the motor impedance parameter prior to correcting the motor impedance parameter.

4. The method of claim 1, wherein controlling the motor comprises:
- configuring a gain parameter of a controller based on the corrected motor impedance parameter; and
- generating a drive signal for the motor using the controller configured with the gain parameter.

5. The method of claim 1, wherein controlling the motor comprises:
- determining a feedback parameter based on the motor impedance parameter; and
- controlling the motor based on the feedback parameter.

6. The method of claim 5, wherein determining the feedback parameter comprises:
- estimating at least one of torque, stator flux, rotor flux, or back EMF of the motor based on the motor impedance parameter.

7. The method of claim 1, comprising:
- responsive to the alignment error exceeding a first threshold, rotating the motor and iterating the applying of the high frequency injection signal, the extracting of the motor impedance parameter, the determining of the alignment error, and the correcting of the motor impedance parameter.

8. The method of claim 7, comprising:
- generating a warning indictor responsive to iterating the applying of the high frequency injection signal, the extracting of the motor impedance parameter, the determining of the alignment error, and the correcting of the motor impedance parameter a number of times greater than a retrial threshold.

9. The method of claim 1, comprising:
- controlling the motor in the start-up mode utilizing a first controller; and
- controlling the motor in the control mode utilizing a second controller.

10. A motor controller, comprising:
- a first controller operating in a start-up mode and configured to:
  - apply a high frequency injection signal to a motor;
  - extract a motor parameter based on a measured response to the high frequency injection signal;
  - determine an alignment error of the motor based on the measured response; and
  - correct the motor parameter based on the alignment error to generate a corrected motor parameter;
- a second controller operating in a control mode and configured to control the motor based on the corrected motor parameter.

11. The motor controller of claim 10, wherein:
- the first controller is configured to determine the alignment error by:
  - determining a first component of the alignment error during a first interval;
  - determining a second component of the alignment error during a second interval; and
  - combining the first component of the alignment error and the second component of the alignment error.

12. The motor controller of claim 11, wherein:
- the first controller is configured to apply the high frequency injection signal by:
  - applying the high frequency injection signal on a first control axis during the first interval; and
  - applying the high frequency injection signal on a second control axis during a second interval; and the first controller is configured to extract the motor parameter by:

determining a first control axis inductance parameter during the first interval; and determining a second control axis inductance parameter during the second interval.

13. The motor controller of claim 11, wherein:

the first controller is configured to:

align the motor to a first position during the first interval;

align the motor to a second position during the second interval; and extract the motor parameter by:

determining a first component of an inductance parameter during the first interval;

determining a second component of the inductance parameter during the second interval; and combining the first component of the inductance parameter and the second component of the inductance parameter to generate the motor parameter prior to correcting the motor parameter.

14. The motor controller of claim 10, wherein:

the second controller is configured to generate a drive signal for the motor using a gain parameter generated based on the corrected motor parameter.

15. The motor controller of claim 10, wherein:

the second controller is configured to:

determine a feedback parameter based on the motor parameter; and control the motor based on the feedback parameter.

16. The motor controller of claim 15, wherein:

the feedback parameter comprises at least one of torque, stator flux, rotor flux, or back EMF of the motor based on the motor parameter.

17. The motor controller of claim 10, wherein:

the first controller is configured to:

responsive to the alignment error exceeding a first threshold, rotate the motor and iterate the applying of the high frequency injection signal, the extracting of the motor parameter, the determining of the alignment error, and the correcting of the motor parameter.

18. The motor controller of claim 17, wherein:

the first controller is configured to generate a warning indictor responsive to iterating the applying of the high frequency injection signal, the extracting of the motor parameter, the determining of the alignment error, and the correcting of the motor parameter a number of times greater than a retrial threshold.

19. A system, comprising:

a motor;

a current sense unit configured to measure current in the motor;

a transform unit configured to generate, based on the current, a first current signal corresponding to a first control axis and a second current signal corresponding to a second control axis;

a first controller operating in a start-up mode and configured to:

apply a high frequency injection signal on the first control axis and the second control axis;

extract a motor parameter based on responses to the high frequency injection signal measured in the first current signal and the second current signal;

determine an alignment error of the motor based on the responses to the high frequency injection signal measured in the first current signal and the second current signal; and correct the motor parameter based on the alignment error to generate a corrected motor parameter; and a second controller operating in a control mode and configured to control the motor based on the corrected motor parameter.

20. The system of claim 19, wherein:

the first controller is configured to:

responsive to the alignment error exceeding a first threshold, rotate the motor and iterate the applying of the high frequency injection signal, the extracting of the motor parameter; the determining of the alignment error, and the correcting of the motor parameter; and generate a warning indictor responsive to iterating the applying of the high frequency injection signal, the extracting of the motor parameter, the determining of the alignment error, and the correcting of the motor parameter a number of times greater than a retrial threshold.

* * * * *